United States Patent [19]

Blyth

[11] Patent Number: 4,563,024
[45] Date of Patent: Jan. 7, 1986

[54] HOLOGRAM IDENTIFICATION DEVICE

[76] Inventor: Jeffrey Blyth, Third Dimension Ltd., Unit C5, Aladdin Works, Long Dr., Greenford, Middlesex UB6 8UH, England

[21] Appl. No.: 476,554

[22] Filed: Mar. 16, 1983

[51] Int. Cl.⁴ .................... B42D 15/00; G03H 1/18
[52] U.S. Cl. ..................... 283/91; 283/904; 350/320
[58] Field of Search .......... 283/85, 77, 86, 88–91, 283/94, 904; 350/3.6, 320

[56] References Cited
U.S. PATENT DOCUMENTS
4,171,766 10/1979 Ruell ........................... 283/86

*Primary Examiner*—Bruce Y. Arnold
*Attorney, Agent, or Firm*—Lee, Smith & Zickert

[57] ABSTRACT

An identification device in the form of a security card or anti-counterfeiting label which comprises a hologram visible by reflection in incident natural light, the film emulsion having been permanently deformed so that the interference fringe spacings differ from those in a non-deformed emulsion, thereby to change from one part of the hologram to another the wavelength of light which is visible by reflection from the hologram.

13 Claims, 2 Drawing Figures

FIG.I
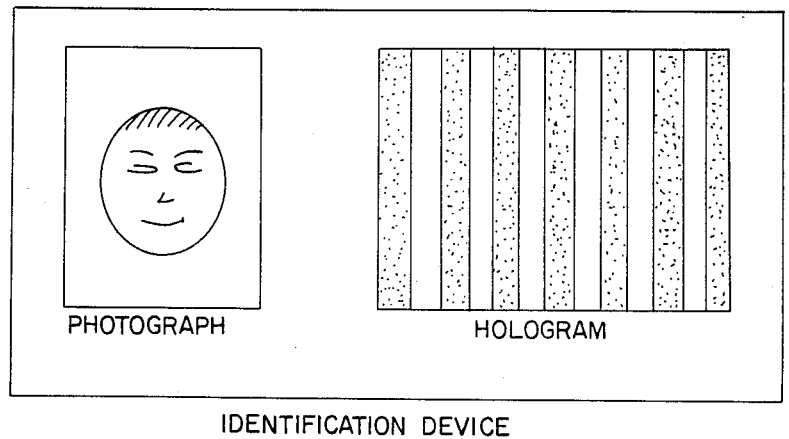
IDENTIFICATION DEVICE
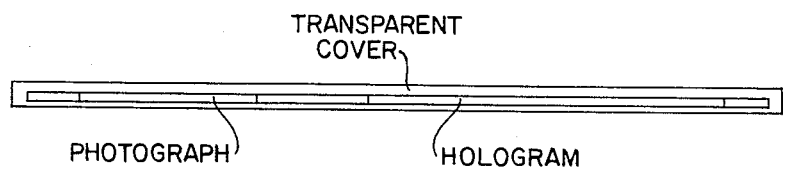
FIG.2

HOLOGRAM IDENTIFICATION DEVICE

FIELD OF THE INVENTION

This invention relates generally to identification devices, and in particular to devices such as identification and/or security cards, labels, tags and like devices which are offered or presented for examination to identify or authenticate (against counterfeiting) a person and/or object with whom the device is associated, e.g. the card holder.

BACKGROUND TO THE INVENTION

Identification cards are well known, both for visual and machine inspection. In the latter case, it is relatively easy to build codes into the card, which codes may not be visually apparent, to enable the machine to verify only an authentic card, and it can readily be made extremely difficult to forge a card which will deceive the machine.

However, identification cards for visual inspection by the human eye to verify the holder can more readily be forged, because it is difficult to incorporate into the card a unique feature which, although readily apparent to the eye, is not readily reproducible.

OBJECT OF THE INVENTION

It is an object of this invention to provide an identification and/or security device which substantially overcomes the above-described problem.

THE INVENTION

According to one aspect of the present invention, there is provided an identification and/or security device which incorporates a multi-colour hologram, the colours of which are visible by reflection of incident natural light.

The term "reflection", as used above and hereinafter, is employed in the conventional context applicable to holography, wherein images are seen by light returned from the hologram to the same side thereof from which the light is incident, although it will be understood that the "reflected" images are in fact produced by a special case of diffraction.

The images and colours of the hologram will readily be apparent in any artificial or other "white" or non-monochromatic light, including natural light.

In practice, in order to provide the hologram with colours which are visible in reflected light, the film emulsion is permanently deformed, selectively in different regions of the area of the hologram. The interference fringes generated with a hologram viewed by reflected light normally lie in layers parallel to the substrate, and the spacings between these layers of fringes, in the direction normal to the substrate, are altered at the regions of deformation. The effect of this is to change the wavelength of the reflected light emanating from these regions of the hologram.

Thus, according to another aspect of the invention, there is provided an identification and/or security device which incorporates a hologram visible by reflection of incident natural light, wherein the film emulsion has been permanently deformed to alter the spacings between the layers of interference fringes from the spacings which exist with a non-deformed emulsion, thereby to change the wavelength of light visible by reflection from the hologram.

Selective deformation can produce a multi-colour hologram. This results in a hologram which is virtually non-reproducible, even by the most practical method, which is the Denisyuk single beam system using a tunable dye laser, because if the laser is initially tuned to one colour to effect reproduction at regions of the hologram of that colour, other regions of the hologram of different colour will become "fogged" and reproduction at these latter regions then produces a very unsatisfactory result to the would-be forger, even if the laser is subsequently returned to the different colour.

Absolute security is afforded by a hologram having an emulsion which has a graduated permanent deformation, e.g. to appear as one colour shading into another colour, because this effectively also eliminates the possibility of reproduction in stages, using suitable masking techniques.

Furthermore, it should be mentioned that, at the present time, a silver halide film, necessary to practical use of the hologram in, for example, a heat sealed cover, is not available for producing a bright hologram image, in the green or blue portions of the spectrum, using the single beam technique.

It will thus be appreciated that, under circumstances which will result in a colour corresponding to which a film is not available for reproduction purposes, a coloured hologram for a security card or the like can be produced by a uniform deformation of the film emulsion over the entire area of the hologram.

It will also be appreciated that, when a security card or the like incorporates a multi-coloured hologram, the term "multi-coloured" extends to shades of the same colour which differ in wavelength sufficiently that reproduction is impossible using a laser tuned to a single frequency.

In practice, the hologram may be incorporated in a sealed, flat transparent cover, together with means identifying the holder such as a photograph. The authenticity of the card, when presented, will be verified by inspection of the hologram, which will present to the eye a plurality of images, which may in themselves be rendered difficult to forge, and which will also show distinctive colouring. For the reasons explained above, it is the latter that is the especially valuable feature for the purpose of authenticity, because the colouring is incorporated during the step of processing the film emulsion containing the hologram, and is not optically reproducible.

The pattern in which the colours are introduced also imparts a visually apparent authenticity. For example, if a striped pattern of two or more colours is introduced, the thickness and spacing of the stripes may be checkable by application of a ruler or the like to the hologram.

It will also be clear that the wide variety of variations which may be incorporated in the multi-colour hologram can enable the production of holograms which readily distinguish between users belonging to different organizations, users of differing categories, users operating within or having access only to certain areas, and even individual users within these different classes. Furthermore, the identification device, in the form of a label, tag or like device, may be applied to objects such as vehicles, documents, valuable works of art, passports and the like in any situation where it is desirable to be able to identify the object for authenticity without risk of forgery or counterfeiting.

BRIEF DESCRIPTION OF THE DRAWINGS

FIG. 1 is a view of the identification device according to the invention.

FIG. 2 is a side elevational view thereof.

DESCRIPTION OF EMBODIMENT

A particular example of identification and/or security device in accordance with the invention will now be described by way of example.

This device comprises an identification card comprising a hologram and a photograph of the holder within a sealed transparent cover.

The hologram is a multi-colour hologram presenting a plurality of images, say at least four, which may be all the same, two or more the same, or all different. In accordance with another important aspect of the present invention, at least one or more of these images may also be, partly or wholly, parts or pieces of other holograms. The colours and images of the hologram are visible when the card is inspected in white light reflected from the hologram. The less diffused the light, the clearer the images will be.

Two colours, e.g. gold and green, are incorporated in the process hologram film as a pattern of parallel, spaced stripes. Of course, any other colours, possibly more than two, and any other pattern, may be incorporated instead.

The hologram has a coating of black paint on the back which, if desired, may be adhered to the cover when the hologram is inserted prior to sealing the cover.

The hologram is preferably produced by deformation of the film emulsion during processing, thereby to alter the spacings of the layers of interference fringes from the spacings present with a non-deformed emulsion, and thereby to determine a changed wavelength of light which is seen when the security device is inspected. Selective deformation produces a multi-coloured hologram, including shade variations of the same colour. Graduated deformation to produce shading from one colour into another is especially valuable. If, as previously explained, the emulsion is deformed uniformly to produce a hologram of a colour which is inherently non-reproducible due to non-availability of suitable film, then multiple colouring can be dispensed with.

EXAMPLE

An exposed hologram is developed in Kodak D-19 developer to a maximum optical density of between 2 and 3.0. The development is then stopped by rinsing in 5% acetic acid solution.

A permanent differential strain in the gelatin emulsion, from one end of the hologram to the other, is achieved as follows.

The hologram is placed in an upright position in an empty vessel. A 5% (w/w) solution of hypo (sodium thiosulphate) is then poured slowly into the vessel until the liquid level reaches, say, the top edge of the hologram. If this level is reached after the pouring has taken place over a minute, say, then this means in effect that the bottom edge of the hologram has been immersed for a minute whereas the top edge has been immersed for only a few seconds or not at all, and all intermediate levels have had different immersion periods in the hypo solution. This means that the undeveloped silver halide grains in the emulsion will have been removed by different degrees according to the immersion time.

If the hologram is now "bleached", as is the common practice, for example in Agfa-Gevaert formulation GP-432 (see page 151 of "Holograms" by Graham Saxby, published by Focal Press Ltd.). then the variation level of residual silver halide will mean that the finished hologram will produce a green image in the area which has been immersed in hypo solution the longest, gradually changing to an orange or red image at the other end, depending on how much gelatin has "collapsed" between the original interference fringes, for example as recorded under red laser light.

An alternative physical means of obtaining the same effect comprises altering the moisture content of the holographic emulsion by a varying degree from one end to the other, prior to the exposure. Moist holographic emulsion can be almost 50% thicker than well-dried emulsion, so that after normal processing, with the gelatin in an equally relaxed state over the area of the hologram, then the fact that the interference fringes were originally recorded in swollen gelatin means that their final spacing will be closer together than in areas where the emulsion was unswollen. Hence the former areas will give green or blue images, whereas the latter areas will give red images because the fringe spacing has not changed.

Modifications

A multi-colour substantially non-reproducible hologram can also be produced in other ways. In one method, the basic hologram, having a non-deformed emulsion, is effectively "laminated" in selected regions of its area with coloured filters. Laminating can be achieved by wetting the film emulsion with water or a hydrophilic chemical. In another method, the basic hologram is coloured in selected regions of its area with photographic dyes. With these two methods also, it may be possible to dispense with multiple colouring if the hologram is uniformly coloured, as to the green or blue portions of the spectrum, to a colour which is not optically reproducible owing to the lack of availability of films which process to that colour.

It will be apparent that various other modifications of the above-described card are possible within the scope of the invention.

I claim:

1. An identification device which incorporates a multi-colour hologram, the colours of which are visible by reflection of incident natural light, said hologram including a film emulsion which has been permanently deformed selectively in differing areas of the hologram, thereby to produce the multiple colours.

2. An identification device which incorporates a hologram having layers of interference fringes lying generally parallel to the film substrate and being visible by reflection of incident natural light, said hologram including a film emulsion which has been permanently deformed selectively to alter the spacings between the layers of interference fringes in one region of the hologram from the spacings which exist in another region thereof, thereby to change the wavelength of light visible by reflection from said one region of the hologram as compared to said another region.

3. A device according to claim 2, wherein the hologram includes a graduated permanent deformation imparted to the film emulsion, thereby shading one visible colour into another.

4. A device according to claim 2, comprising a said hologram incorporated in a sealed transparent cover, together with a second identification device such as a photograph.

5. A device according to claim 2, having a striped pattern of at least two colours.

6. A device according to claim 2, wherein the hologram presents a plurality of images at least one of which is an image of at least part of another hologram.

7. A device according to claim 2, wherein the hologram includes a film emulsion which has been deformed prior to exposure to form the holographic images.

8. A device according to claim 2, wherein the hologram includes a film emulsion which has been deformed by permanent differential straining after exposure to form the holographic images and at least partial development.

9. A device according to claim 2, wherein the hologram contains images at least one of which is an image of at least part of another hologram.

10. A method of producing an identification device which incorporates a hologram having layers of interference fringes lying generally parallel to the film substrate and being visible by reflection of incident natural light, the method comprising the steps of forming layers of interference fringes lying generally parallel to a film substrate, said layers being formed to be visible by reflection of incident natural light, and permanently deforming a film emulsion selectively to alter the spacings between the layers of interference fringes in one region of the hologram from the spacings which exist in another region thereof, to thereby change the wavelength of light visible by reflection from said one region of the hologram as compared to another region thereof.

11. The method according to claim 10 including the step of imparting a graduated permanent deformation to the film emulsion, thereby shading one visible colour into another during the step of permanently deforming the film emulsion.

12. The method according to claim 10 including the step of deforming the film emulsion prior to exposure to form holographic images.

13. The method according to claim 10 in which the step of permanently deforming the film emulsion includes the step of deforming the film emulsion by permanent differential straining after exposure to form the holographic images.

* * * * *